US012729097B2

(12) United States Patent
Valjus et al.

(10) Patent No.: US 12,729,097 B2
(45) Date of Patent: Sep. 8, 2026

(54) ROPE AND ELEVATOR

(71) Applicant: Kone Corporation, Helsinki (FI)

(72) Inventors: Petteri Valjus, Helsinki (FI); Juha Helenius, Helsinki (FI); Tapani Talonen, Helsinki (FI); Erkka Kiviaho, Helsinki (FI); Tarvo Viita-Aho, Helsinki (FI); Petri Kere, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/646,389

(22) Filed: Apr. 25, 2024

(65) Prior Publication Data

US 2024/0294358 A1 Sep. 5, 2024

Related U.S. Application Data

(63) Continuation of application No. PCT/FI2021/050751, filed on Nov. 8, 2021.

(51) Int. Cl.
*B66B 7/06* (2006.01)
*D07B 1/16* (2006.01)
*B66B 11/00* (2006.01)

(52) U.S. Cl.
CPC ................ *B66B 7/06* (2013.01); *D07B 1/162* (2013.01); *B66B 11/0045* (2013.01); *D07B 2201/102* (2013.01); *D07B 2201/2092* (2013.01); *D07B 2205/2064* (2013.01); *D07B 2501/2007* (2013.01)

(58) Field of Classification Search
CPC .. B66B 7/06; D07B 2201/2087; D07B 1/162; D07B 1/16; D07B 1/6073
See application file for complete search history.

(56) References Cited

U.S. PATENT DOCUMENTS 3,634,607 A * 1/1972 Coleman .................. H01B 7/14 174/113 R
3,824,777 A * 7/1974 Riggs ........................ D07B 7/12 57/217
4,344,278 A * 8/1982 Jamison .................... D07B 7/12 57/232
4,365,467 A * 12/1982 Pellow ................. D07B 1/0673 57/212
4,606,183 A * 8/1986 Riggs ...................... D07B 1/144 57/7

(Continued)

FOREIGN PATENT DOCUMENTS

CN 101092224 A 12/2007
CN 204174466 U 2/2015

(Continued)

OTHER PUBLICATIONS

International Search Report for International Application No. PCT/FI2021/050751 dated Jun. 30, 2022.

(Continued)

*Primary Examiner* — Michael A Riegelman
(74) *Attorney, Agent, or Firm* — Harness, Dickey & Pierce, P.L.C.

(57) ABSTRACT

A rope and an elevator. The rope comprises a core, an outer layer of strands, comprising at least four outer strands, and an elastomeric coating creating at least the outer surface of the rope.

19 Claims, 4 Drawing Sheets

(56) References Cited

U.S. PATENT DOCUMENTS

| | | | | |
|---|---|---|---|---|
| 5,461,850 | A * | 10/1995 | Bruyneel | D07B 1/0613 57/902 |
| 6,692,829 | B2 * | 2/2004 | Stubler | D07B 7/145 428/378 |
| 8,402,731 | B2 * | 3/2013 | Naito | D07B 5/006 57/210 |
| 8,418,433 | B2 * | 4/2013 | Noguchi | D07B 1/162 57/237 |
| 9,708,758 | B2 * | 7/2017 | Amils | D07B 5/00 |
| 9,731,938 | B2 * | 8/2017 | Wesson | B66B 7/06 |
| 11,459,209 | B2 * | 10/2022 | Zhao | D06M 13/152 |
| 11,485,611 | B2 * | 11/2022 | Kodeck | D07B 5/006 |
| 11,548,763 | B2 * | 1/2023 | Zhao | B66B 7/06 |
| 2002/0189227 | A1 * | 12/2002 | Roux | D07B 7/145 57/7 |
| 2005/0034375 | A1 * | 2/2005 | Vanderbeken | F16C 1/20 49/507 |
| 2005/0126859 | A1 * | 6/2005 | Aulanko | D07B 1/0673 187/254 |
| 2006/0174604 | A1 * | 8/2006 | Vanderbeken | B66B 7/06 57/217 |
| 2010/0038112 | A1 * | 2/2010 | Grether | H01B 13/0006 174/128.1 |
| 2015/0144245 | A1 * | 5/2015 | Bucher | D02G 3/36 57/216 |
| 2017/0370046 | A1 * | 12/2017 | Rommel | D07B 1/165 |
| 2018/0251940 | A1 * | 9/2018 | Carter | D07B 1/144 |
| 2020/0248404 | A1 * | 8/2020 | Morren | B66B 7/06 |
| 2020/0362511 | A1 * | 11/2020 | Hunter | D07B 1/025 |
| 2021/0102335 | A1 * | 4/2021 | Mitchell | A61B 1/0057 |
| 2021/0284501 | A1 * | 9/2021 | Kodeck | D07B 5/006 |
| 2021/0380371 | A1 * | 12/2021 | De Roose | D07B 1/162 |
| 2023/0119220 | A1 * | 4/2023 | Morgan | D07B 5/005 254/266 |
| 2024/0294358 | A1 * | 9/2024 | Valjus | B66B 7/06 |

FOREIGN PATENT DOCUMENTS

| | | | |
|---|---|---|---|
| DE | 102004061385 | A1 | 7/2006 |
| JP | 2002327381 | A | 11/2002 |
| WO | 2004055263 | A1 | 7/2004 |
| WO | 2013160139 | A2 | 10/2013 |

OTHER PUBLICATIONS

Written Opinion for International Application No. PCT/FI2021/050751 dated Jun. 30, 2022.

Chinese Office Action dated Jul. 4, 2026 issued in corresponding Chinese Patent Appln. No. 2021801039365.

* cited by examiner

ROPE AND ELEVATOR

CROSS-REFERENCE TO RELATED APPLICATION

This application is a continuation of PCT International Application No. PCT/FI2021/050751 which has an International filing date of Nov. 8, 2021, the entire contents of which are incorporated herein by reference.

BACKGROUND

The invention relates to a rope.

The invention further relates to an elevator.

Some traction elevator hoisting systems utilizes coated ropes. Depending on hoisting function optimization, such as cost, performance, durability, installability, maintainability, reliability, modularity, coatings have some advantages, but also some disadvantages.

One of the disadvantages of the coated ropes is their susceptibility to twisting, especially when the coating has a high friction, and/or in presence of small fleet angles between the pulleys and traction sheave alignments together with a high friction. The twisting has a remarkable effect to steel wire torsion stresses. While cumulative movements of outer strands and wires are prevented by the coating, torsional stresses are created more easily than in conventional non-coated ropes. A combination of fatigue bending and torsional stresses will exceed critical fatigue limit of wire material.

BRIEF DESCRIPTION

Viewed from a first aspect, there can be provided a rope, comprising a core, an outer layer of strands, comprising at least four outer strands, and an elastomeric coating creating at least the outer surface of the rope.

Thereby a coated rope not prone to twisting may be achieved.

Viewed from a further aspect, there can be provided an elevator, comprising an elevator shaft, an elevator car arranged in the elevator shaft, and a roping system, wherein the roping system comprises the rope as disclosed in this disclosure.

Thereby an elevator the reliability of which is good and need of service low may be achieved.

The rope and the elevator are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the core is constructed from a polymer material.

An advantage is that a core that is highly flexible may be achieved.

In one embodiment, the core further comprises a core strand, such as a metallic core strand.

An advantage is that the load-carrying cross-sectional area of the rope may be extended or maximized in terms of diameter of spherical area of the rope.

In one embodiment, the number of the outer strands is 4-9.

An advantage is that the twist sensitiveness of the rope may be lessened.

In one embodiment, the outer strands has a regular lay.

An advantage is that the axial strength, Young's modulus, and the bending stiffness of the rope may be optimized.

In one embodiment, the outer strands has a lang lay.

An advantage is that the axial strength, Young's modulus, and the bending stiffness of the rope may be optimized.

In one embodiment, the relation of the diameter (do) of the outer strand and the diameter (D) of the rope is selected in range of $do=0.16\times D-0.45\times D$.

An advantage is that a round rope may be manufactured.

In one embodiment, the rope comprises an inner layer of strands arranged between the core and the outer layer of strands and comprising plurality of inner strands, and that the outer strands have an opposite lay, i.e. right or left lay, compared to the inner strands having left or right lay, respectively.

An advantage is that the twist sensitiveness of the rope may further be decreased, since there is always present a strand lay direction turned to close direction, which opposes twisting, regardless the direction in which the rope is twisting.

In one embodiment, the inner strands have a regular lay.

An advantage is that the axial strength, Young's modulus, and the bending stiffness of the rope may be optimized.

In one embodiment, the inner strands have a lang lay.

An advantage is that the axial strength, Young's modulus, and the bending stiffness of the rope may be optimized.

In one embodiment, the core is of IWRC or WSC type, and the inner strands has the same lay direction with the core.

An advantage is that the twist sensitiveness of the rope may be lessened, especially when using a high frictional coating on surface of the rope, and/or when pulley system causes some fleet angles due to improper orientation thereof.

In one embodiment, the lay length of the strand is selected in range of $3.0\times di-20\times di$, preferably in range of $3.5\times di-7\times di$.

An advantage is that a rope that can be bent on a typical elevator pulley without significant additional bending stresses causing fatigue of the wires can be achieved.

In one embodiment, the relation of the lay length of the inner strand and the lay length of the outer strand are selected so that that all the outer and inner strands and the wires thereof are loaded by a stress varying not more than 10% in an axial strain of the rope.

An advantage is that the load carrying performance of the rope may be optimized to be suitable for elevator characteristics tension levels, alternating tensions due to varying loads and bending over pulleys.

In one embodiment, the elastomeric coating has adhesion to all the outer strands and/or to all the inner strands.

An advantage is that a better performance of the rope when using non-rotating rope strand layers structures may be achieved.

In one embodiment, the elastomeric coating has adhesion to all wires in all the outer strands and/or to all wires in all the inner strands.

An advantage is that the micromovements of the wires which cause fretting may be minimized.

In one embodiment, the elastomeric coating has adhesion to the core.

An advantage is that a rope less sensitive to twisting caused by fleet angles, a high coating friction, reels and tension variations, as well as by faulty installation, may be achieved.

In one embodiment, the elastomeric coating is a single layer coating.

An advantage is that the manufacturing of the rope is simple.

In one embodiment, the elastomeric coating is a multi-layer coating.

An advantage is that the layers may be optimized according to their desired function in the rope.

In one embodiment, the multi-layer coating comprises an outer layer and an inner layer, wherein the outer layer has a higher Shore hardness than the inner layer.

An advantage is that a rope being highly abrasion resistant but still having low twist sensitiveness may be achieved, and on the other hand, softer inner material having good yield and strain characteristics may maintain its contact with the wires better.

In one embodiment, the multi-layer coating comprises an outer layer and an inner layer, wherein the inner layer has a higher Shore hardness than the outer layer.

An advantage is that a high friction coefficient on the outer surface of the rope may be achieved.

In one embodiment, the outer layer has a Shore hardness selected in range of Shore 70D-92A, and the inner layer in range of Shore 92A-95A.

An advantage is that the abrasion resistance and low twist sensitiveness of the rope may be optimized together with the required level of friction coefficient.

In one embodiment, the elastomeric coating has a thickness that is 7-15% of the diameter (D) of the rope.

An advantage is that the non-twisting properties of the rope may be enhanced.

In one embodiment, the elastomeric coating comprises thermoplastic elastomer.

An advantage is that a coating having good thermal properties and material stability when exposed to a broad range of temperatures may be achieved.

In one embodiment, the elastomeric coating comprises thermoplastic polyurethane.

An advantage is that a coating having high elasticity, resistance to oil, grease, and abrasion may be achieved.

In one embodiment, the rope comprises filler strands.

An advantage is that the load-carrying cross-sectional area of the rope may be extended, and the minimum breaking force of the rope increased.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
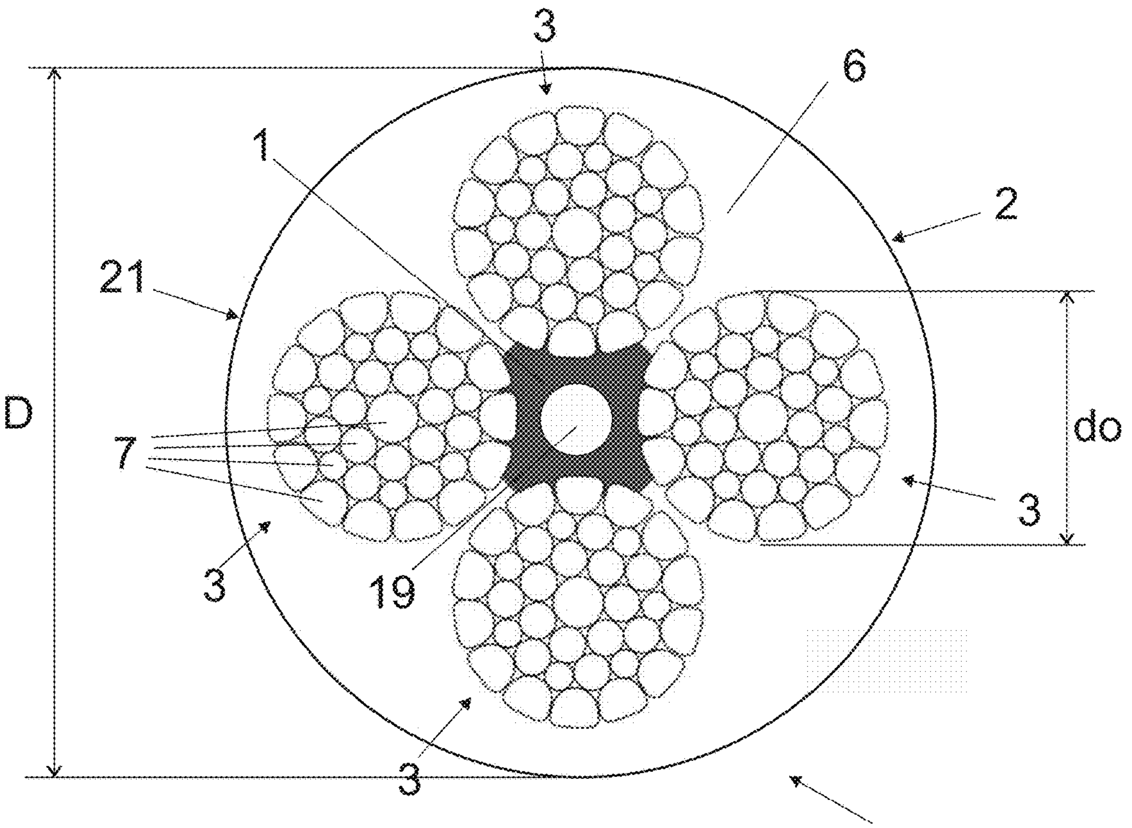
FIG. 1 is a schematic cross-sectional view of a rope, an FIG. 2 is a schematic cross-sectional view of another rope.

FIG. 1 is a schematic cross-sectional view of a rope. The rope 100 comprises a core 1, an outer layer of strands 2 comprising four outer strands 3, and an elastomeric coating 6 creating at least the outer surface 21 of the rope 100.

In one embodiment, the core 1 is constructed from an elastomeric polymer material. The term “elastomeric” refers to the rubber-like properties of a polymer, i.e., a material being able to regain its original shape when a load is removed from the material.

In one embodiment, the elastomeric polymer material of the core 1 comprises thermoplastic elastomer(s), i.e. one or more elastomer(s) having thermoplastic properties. The thermoplastic elastomer may be, for example, selected from styrenic block copolymers (TPE-s), thermoplastic polyolefinelastomers (TPE-o), thermoplastic Vulcanizates (TPE-v or TPV), thermoplastic polyurethanes (TPU), thermoplastic co-polyester, (TPE-E) and thermoplastic polyamides (TPE-A).

In one embodiment, the elastomeric polymer material comprises thermoplastic polyurethane.

In one embodiment, the elastomeric polymer material of the core 1 comprises thermoset elastomer(s), such as natural rubber (NR) or polyurethane (PUR).

The elastomeric polymer material may be filled or mixed with fillers and functional additives, such as reinforcing materials, fire retardant materials, etc.

In one embodiment, such as shown in FIG. 1, the elastomeric polymer material of the core has an outer shape that fills substantially all space between the outer strands 3. However, this is not always necessary, the shape of the core 1 may be round or roundish, for instance.

In one embodiment, the core 1 comprises a core strand 19 that may be embedded in the core. In another embodiment, the core 1 consists of the core strand 19. The core strand 19 may be e.g. of straight woven natural fiber, sisal, polypropylene or steel. The core strand 19 type is, for example, a wire strand core (WSC), an independent wire rope core (IWCR) type, or a fibre core (FC) type.

In one embodiment where the core strand comprises wires, the elastomeric polymer material of the core is adhered to all the wires of the core strand.

In one embodiment, there may be two or even more core strands 19 embedded in the core.

According to an aspect, the outer layer of strands 2 comprises 4-12 strands. In one embodiment, the outer strands 3 are constructed from steel wires, i.e. they are steel strands.

In one embodiment, the outer strand 3 comprises 7-36 wires, preferably 7-25 wires.

In one embodiment, the outer strand 3 has a two-layer structure such that there is one central wire surrounded by six outer wires, i.e. there is a structure of 1+6.

In one embodiment, the outer strand 3 has a three-layer structure such that there is one central wire surrounded by nine first wires, and these first wires are surrounded by nine outer wires, i.e. there is a structure of 1+9+9.

In one embodiment, the outer strand 3 has a four-layer structure such that there is one central wire surrounded by six first wires, and these first wires are surrounded by six second wires, and these second wires are surrounded by six outer wires, i.e. there is a structure of 1+6+6+6.

In one embodiment, the outer strands 3 have a regular lay. In another embodiment, the outer strands 3 have a lang lay. Said regular lay may have a right lay or a left lay. According to an aspect, said lang lay may resist an internal twisting of the strand more than said regular lay.

In one embodiment, the relation of the diameter (do) of the outer strand 3 and the diameter (D) of the rope 100 is selected in range of do=0.16×D–0.45×D.

In one embodiment, the lay length of the outer strand 3 is selected in range of 3.0×do–20×do, preferably in range of 3.5×do–5×do.

In one embodiment, the elastomeric coating 6 has a thickness that is 7-15% of the diameter D of the rope 100. Said thickness is the shortest distance from the outer strand 3 to the outer surface 21 of the rope.

According to an embodiment, the elastomeric coating 6 has adhesion to all the outer 3 strands over all length of the rope. In one embodiment, an adhesion agent or a primer is arranged on surfaces of the strand and/or wires for promoting adhesion prior to applying the elastomeric coating.

In one embodiment, all gaps between the core 1 and the outer strands 3 are filled with the coating 6.

In one embodiment, the elastomeric coating 6 has adhesion to all wires 7 in all the outer 3 strands. The penetration of the coating material between all the strands and inside thereof is ensured with high enough pressure in the manufacturing of the rope, e.g. in an extrusion process.

In one embodiment, the elastomeric coating 6 fills all gaps and voids between the strands and the core, preferably also all gaps and voids inside the strands. This feature further adds twist-resistance properties of the rope when the coating keeps wires and strands tightly together.

In one embodiment, the elastomeric coating 6 is a single layer coating, i.e. the elastomeric coating comprises just one-layer and one material or material composition. In another embodiment, the elastomeric coating 6 is a multi-layer coating, i.e. it has at least two layers of different materials. The multi-layer coating may be manufactured by a co-extrusion method, for instance.

In one embodiment of the multi-layer coating, the thickness of the outer layer is selected in range of 0.4 mm-2.5 mm. In one embodiment, said thickness is selected in range of 0.75 mm-1 mm. In one embodiment, said thickness is selected in range of 7%-15% of the diameter D of the rope 100. In one embodiment, said thickness is 11.5% of the diameter D of the rope 100.

In one embodiment of the multi-layer coating comprises an outer layer 9 and an inner layer 10 (shown in FIG. 3) such that the outer layer 9 has a higher Shore hardness than the inner layer 10. In one embodiment, the outer layer 9 has a Shore hardness selected in range of Shore 70D-92A, and the inner layer 10 in range of Shore 92A-95A.

The term "elastomeric" refers to the rubber-like properties of a polymer, i.e., a material being able to regain its original shape when a load is removed from the material.

In one embodiment, the elastomeric coating 6 comprises thermoplastic elastomer(s), i.e. one or more elastomer(s) having thermoplastic properties. The thermoplastic elastomer may be, for example, selected from styrenic block copolymers (TPE-s), thermoplastic polyolefinelastomers (TPE-o), thermoplastic Vulcanizates (TPE-v or TPV), thermoplastic polyurethanes (TPU), thermoplastic co-polyester, (TPE-E) and thermoplastic polyamides (TPE-A).

In one embodiment, the elastomeric coating 6 comprises thermoplastic polyurethane.

In one embodiment, the elastomeric coating 6 comprises thermoset elastomer(s), such as natural rubber (NR) or polyurethane (PUR). The elastomeric coating 6 may be filled or mixed with fillers and functional additives, such as reinforcing materials, fire retardant materials, etc.

In one embodiment, the elastomeric polymer material of the core 1 comprises the same polymer as the inner part of the elastomeric coating 6 being contact with the core 1. However, this is not always necessary, i.e. the polymer material of the core may differ from the material of the inner part of the coating.

Figure 2:
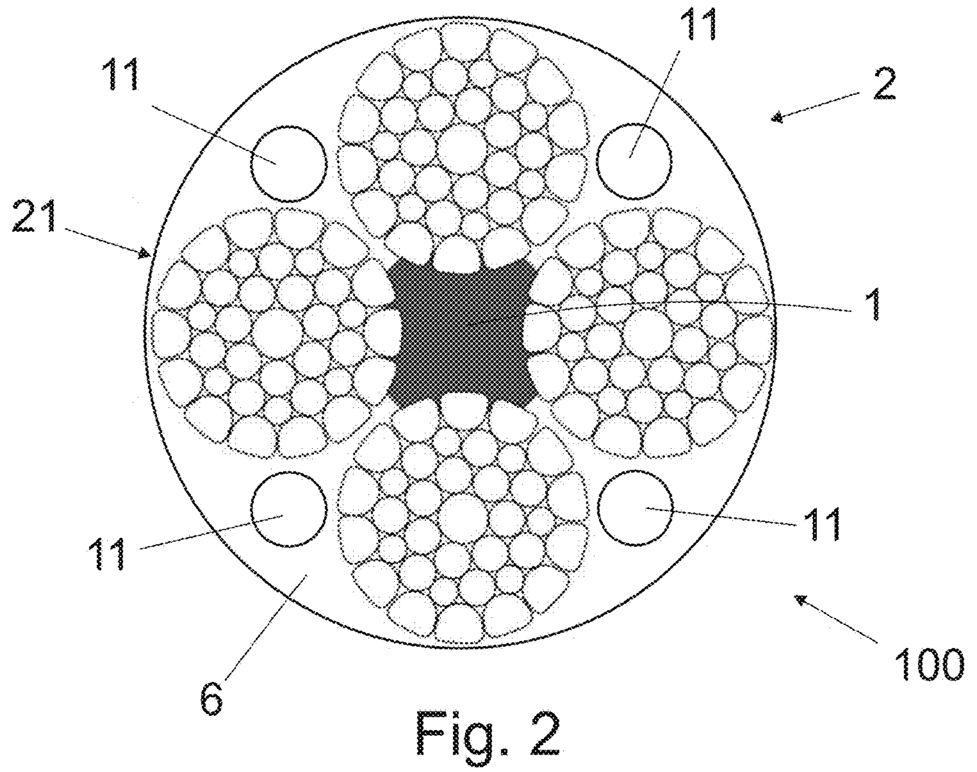

FIG. 2 is a schematic cross-sectional view of another rope. In one embodiment, the rope 100 comprises filler strands 11. The embodiment shown in FIG. 2 has four filler strands. The number of the filler strands may vary, typically in range of 4 to the number of the outer strands 3, and their diameter is substantially smaller compared to the outer strands 3.

In one embodiment, the filler strand 11 is made of steel wires. In one embodiment, the filler strand 11 has a WSC (wire strand core) structure. In one embodiment, the filler strand 11 has a IWSC (independent wire strand core) structure.

In one embodiment, such as shown in FIG. 2, the core 1 is without any core strands. In this kind of embodiment, the core is completely made of the elastomeric polymer material, optionally reinforced with reinforcing material, described in this disclosure.

Figure 3:
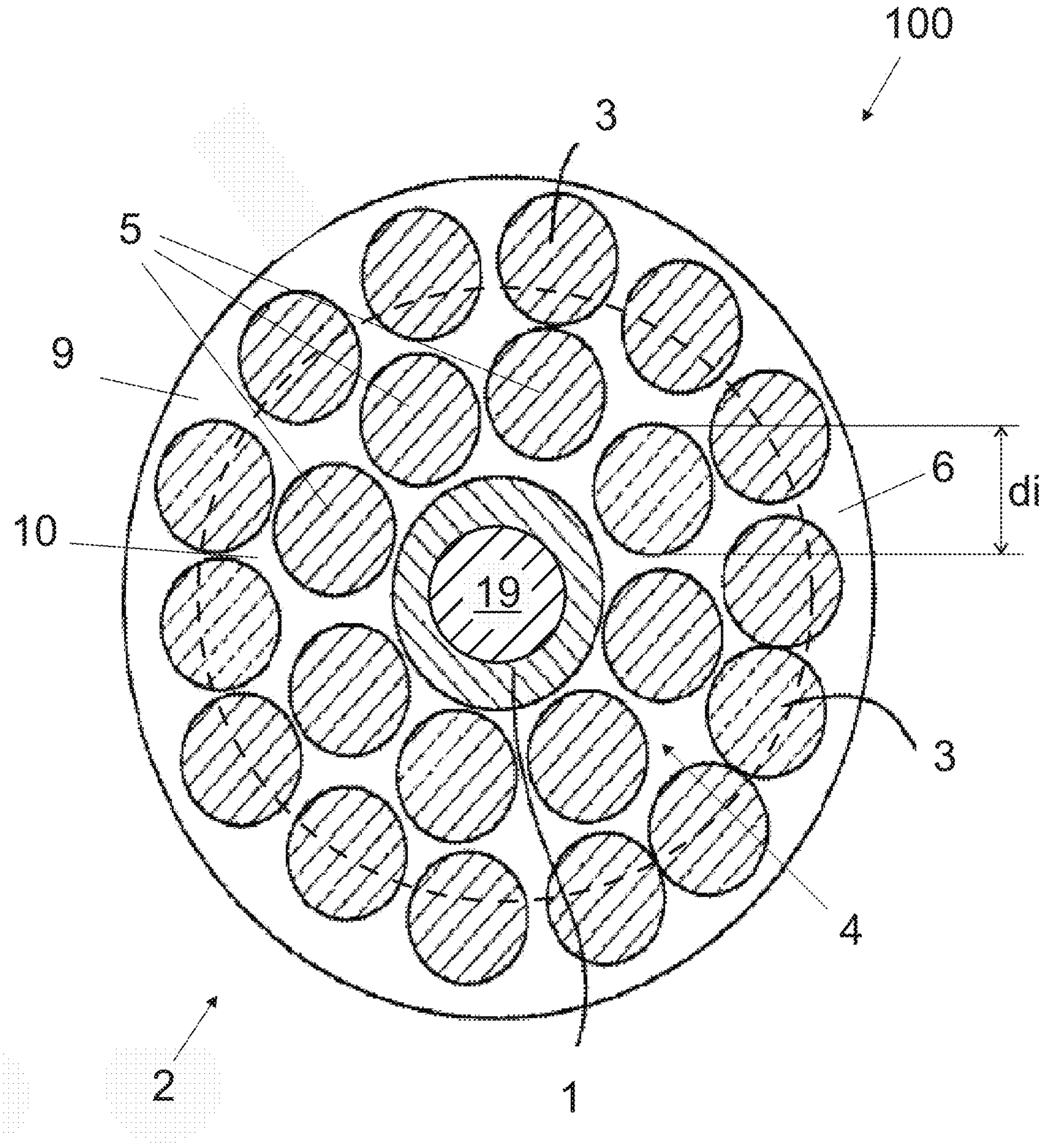
FIG. 3 is a schematic cross-sectional view of a third rope.

FIG. 3 is a schematic cross-sectional view of a third rope. In one embodiment, the rope 100 comprises an inner layer of strands 4 that is arranged between the core 1 and the outer layer of strands 2. The inner layer of strands comprises plurality of inner strands 5. In one embodiment, the number of the inner strands is 4-9. The embodiment shown in FIG. 3 comprises eight inner strands.

Number of the strands both in the inner and the outer layer is chosen such way that the rope fill ratio is high and optimum for coated ropes so that the minimum breaking force is maximized and penetration of the coating to the inner structure of the rope and between the wires is enabled.

In one embodiment, the inner strands 5 are steel strands, and they may have a regular lay or a lang lay.

In one embodiment, the inner strand 5 comprises 7-36 wires.

In one embodiment, the core 1 comprises a core strand 19 of IWRC or WSC type, and the inner strands 5 has the same lay direction with the core.

In one embodiment, the relation of the diameter (di) of the inner strand 5 and the diameter D of the rope 100 is selected in range of di=0.16×D–0.45×D.

In one embodiment, the lay length of the inner strand 5 is selected in range of 3.0×do–20×do, preferably in range of 3.5×do–5×do.

In one embodiment, the inner strand 5 has a two-layer structure such that there is one central wire surrounded by six outer wires, i.e. there is a structure of 1+6.

In one embodiment, the inner strand 5 has a three-layer structure such that there is one central wire surrounded by nine first wires, and these first wires are surrounded by nine outer wires, i.e. there is a structure of 1+9+9.

In one embodiment, the inner strand 5 has a four-layer structure such that there is one central wire surrounded by six first wires, and these first wires are surrounded by six second wires, and these second wires are surrounded by six outer wires, i.e. there is a structure of 1+6+6+6.

In one embodiment, the inner strands 5 has an opposite lay compared to the outer strands 3. Thanks to this, rotation resistances of the strand layers 2, 4 may be balanced as per distance from rope neutral axis, and the sum of layer torques may be arranged to be zero.

For instance, the inner strands 5 may have a right lay and the outer strands 3 a left lay, or vice versa. Thus, in embodiments where the core 1 comprises a core strand 19 of IWRC or WSC type, and the inner strands 5 has the same lay direction with the core, the outer strands 3 may have an opposite lay compared to the core strand 19.

According to an aspect, the relation of the lay length of the inner strand 5 and the lay length of the outer strand 3 are selected so that that all the outer and inner strands 3, 5 and the wires 7, 8 thereof are loaded by a substantially same stress. In one embodiment, the concept "substantially same stress" means that said stresses are varying not more than 10%, preferably not more than 5% in an axial strain of the rope.

As disclosed earlier in this disclosure, the elastomeric coating 6 may have a single layer structure or a multi-layer structure, and have adhesion to all the outer strands 3, even to adhesion to all wires 7 in all the outer strands. In one embodiment, the elastomeric coating 6 has adhesion to all the inner strands 5, too, preferably to all wires 8 in all the inner strands.

In one embodiment, the elastomeric coating 6 has adhesion to the core 1. Thus, in some embodiments, the elastomeric coating 6 has an adhesion to all the strands 3, 5 and wires 7, 8 as well as to the core 1.

In an embodiment, the core 1 is filling substantially all the space within encircling strands. One embodiment of this is shown in FIG. 1 and where the core 1 is in contact with the outer strands 5. Similar structure is possible with the inner strands if they are present in the rope, i.e. that the core 1 is filling substantially all the space within encircling inner strands. In another embodiment, the core 1 does not fill all said space. The cross-section of the core 1 may be round or roundish, such as shown in FIG. 3.

In an embodiment comprising the outer layer of strands 3 and the inner layer of strands 4, there may also be present filler strands, the type of which has already described in this disclosure. The filler strands may be arranged between the outer strands, between the inner stands and/or between outer and inner layers of strands.

Figure 4:
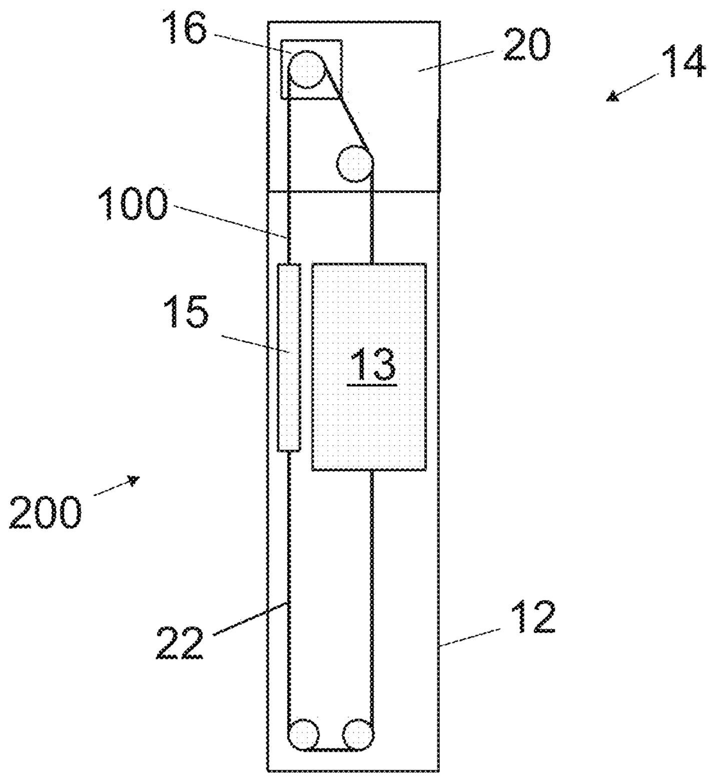
FIG. 4 is a schematic side view of an elevator.

FIG. 4 is a schematic side view of an elevator. According to an aspect, the rope 100 disclosed in this disclosure is arranged in an elevator 200. The lifting height of the elevator may be e.g. tens of meters, even to hundred meter(s). The elevator comprises an elevator shaft 12, an elevator car 13 arranged in the elevator shaft 12 for moving therein, and a roping system 14 that is arranged to participate to the moving of the elevator car in the elevator shaft. Said roping system 14 comprises at least one rope 100 as disclosed herein. In one embodiment, the roping system comprises at least two parallelly arranged ropes 100. In one embodiment, there are 3-11, preferably 3-6 parallelly arranged ropes 100 in the roping system.

The elevator 200 may be used e.g. for moving passengers and/or cargo.

In one embodiment, the rope 100 is connected to the elevator car 13.

In one embodiment, the elevator 200 comprises a counterweight 15 that is connected to the rope 100.

In one embodiment, the roping system 14 comprises at least one compensating rope 22 that is connected between the elevator car 13 and the counterweight 15. In one embodiment, there are 3-11, preferably 3-6 parallelly arranged compensating ropes 22 in the roping system.

The compensating rope 22 serves as a safety appliance that prevents or reduces abrupt movements of the elevator car e.g. in stalling situations. One further advantage of having coated compensating rope 22 is that lubrication or greasing service of the compensating rope is not necessary.

The elevator 200 comprises a machinery 16 for driving moving elevator components, e.g. the roping comprising at least one rope 100.

In one embodiment, the machinery 16 is arranged in a machine room 20 separate from the elevator shaft 12. The machine room 20 can be arranged above or top the elevator shaft (also known as a PT structure) as shown in FIG. 4, below the elevator shaft (also known as a PU structure), on side of the elevator shaft (also known as a PS structure), or inside the elevator shaft (also known as a PW structure).

Figure 5:
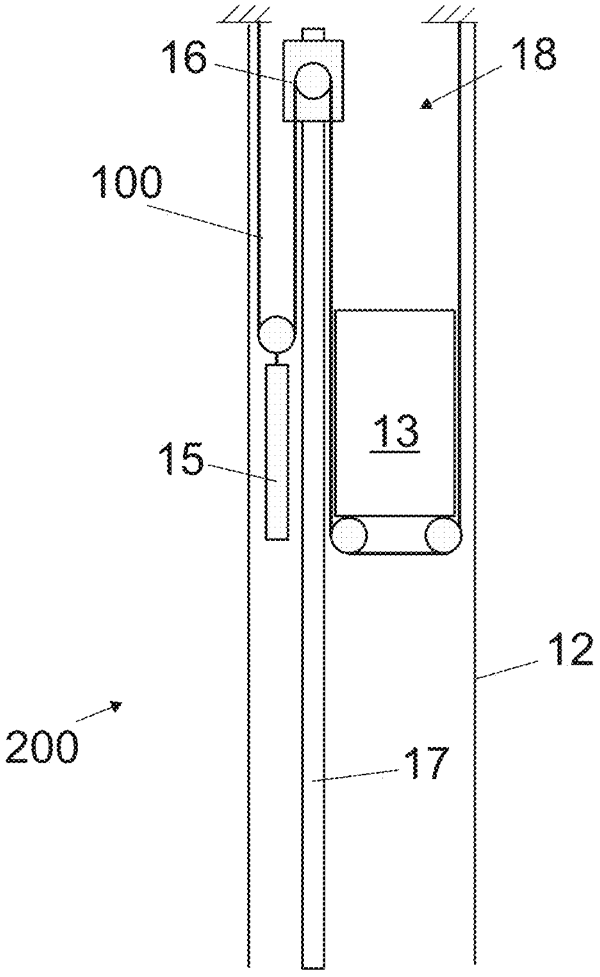
FIG. 5 is a schematic side view of another elevator.

FIG. 5 is a schematic side view of another elevator. In one embodiment, the roping system 14 that comprises at least one rope 100 provides a roping ratio of 1:1, i.e. the machinery has to drive ten meters of rope 100 to lift the elevator car 13 ten meters, for instance. One example of this kind of embodiment is shown in FIG. 4.

In another embodiment, the roping system 14 comprises a reduction arrangement 18 that is arranged for providing a reduced speed for the elevator car. In one embodiment, said speed is reduced by a roping ratio of 2:1. This means that, for example, the machinery has to drive 20 meters of rope 100 to lift the elevator car 13 ten meters, while the force needed to lift the elevator car 13 is halved. It is to be noted that the reduced by a roping ratio may be selected to be less than 2:1 or more than 2:1, such as 4:1.

In one embodiment, the machinery 16 is arranged inside the elevator shaft 12. This kind of machinery 16 can be attached e.g. to an elevator car guide 17. The machinery 16 can be arranged in upper parts of the elevator shaft 12, such as shown in FIG. 5, but this is not necessary.

In FIGS. 4 and 5 the counterweight 15 is shown beside the elevator car 13. However, in other embodiments, the counterweight is situated back of the elevator car. This kind of arrangement is realized by guiding the roping to turn 90° (seen from above) from beside of the elevator car to backside thereof.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 core
2 outer layer of strands
3 outer strand
4 inner layer of strands
5 inner strand
6 elastomeric coating
7 wire of outer strand
8 wire of inner strand
9 outer layer of coating
10 inner layer of coating
11 filler strand
12 elevator shaft
13 elevator car
14 roping system
15 counterweight
16 machinery
17 elevator car guide

18 reduction arrangement
19 core strand
20 machine room
21 outer surface
22 compensating rope
100 rope
200 elevator

The invention claimed is:

1. A rope, comprising
a core comprising an elastomeric material, the core having a core strand embedded therein,
an outer layer of strands surrounding the core, the outer layer of strands including at least four outer strands, and
an elastomeric coating creating at least an outer surface of the rope,
wherein the core has an outer shape that fills space between the at least four outer strands, and
the elastomeric coating is a multi-layer coating comprising an outer elastomeric coating layer having a Shore hardness in a range of Shore 70D-92A, and an inner elastomeric coating layer having a Shore hardness in a range of Shore 92A-95A.

2. The rope as claimed in claim 1, comprising
an inner layer of strands arranged between the core and the outer layer of strands, the inner layer of strands including a plurality of inner strands.

3. The rope as claimed in claim 2, wherein
the plurality of inner strands have a regular lay.

4. The rope as claimed in claim 2, wherein
the plurality of inner strands have a lang lay.

5. The rope as claimed in claim 2, wherein
a lay length of each inner strand of the plurality of inner strands is selected in a range of 3.0×di-20×di.

6. The rope as claimed in claim 5, wherein
the lay length of each inner strand of the plurality of inner strands is selected in a range of 3.5×di-7×di.

7. The rope as claimed in claim 2, wherein
a relation of a lay length of each inner strand of the plurality of inner strands and a lay length of each outer strand of the at least four outer strands is selected so that that all strands of the at least four outer strands and the plurality of inner strands and wires thereof are configured to be loaded by a stress varying not more than 10% in an axial strain of the rope.

8. The rope as claimed in claim 2, wherein
the elastomeric coating has adhesion to all inner strands of the plurality of inner strands.

9. The rope as claimed in claim 8, wherein
the elastomeric coating has adhesion to all wires in all inner strands of the plurality of inner strands.

10. The rope as claimed in claim 1, wherein
a lay length of each outer strand of the at least four outer strands is selected in a range of 3.0×do-20×do.

11. The rope as claimed in claim 10, wherein
the lay length of each outer strand of the at least four outer strands is selected in a range of 3.5×do-7×do.

12. The rope as claimed in claim 1, wherein
the elastomeric coating has adhesion to all outer strands of the at least four outer strands.

13. The rope as claimed in claim 1, wherein
the elastomeric coating has adhesion to all wires in all outer strands of the at least four outer strands.

14. The rope as claimed in claim 1, wherein
the elastomeric coating has adhesion to the core.

15. The rope as claimed in claim 1, wherein
the elastomeric coating has a thickness that is 7-15% of a diameter of the rope.

16. The rope as claimed in claim 1, wherein
the elastomeric coating comprises a thermoplastic elastomer.

17. An elevator, comprising:
an elevator shaft,
an elevator car arranged in the elevator shaft, and
a roping system, wherein
the roping system comprises the rope as claimed in claim 1.

18. The elevator as claimed in claim 17, comprising:
a machinery for driving moving elevator components, said machinery being attached to an elevator car guide.

19. A rope, comprising
a core comprising an elastomeric material, the core having a core strand embedded therein,
an outer layer of strands surrounding the core, the outer layer of strands including at least four outer strands,
a plurality of filler strands surrounding the outer layer of strands, and
an elastomeric coating creating at least an outer surface of the rope,
wherein
the plurality of filler strands have a diameter smaller than a diameter of the at least four outer strands, and
the plurality of filler strands are spaced apart from the outer layer of strands, between the outer layer of strands and the outer surface of the rope along a radial direction from the core.

* * * * *